United States Patent
Stoffel et al.

(10) Patent No.: US 11,639,447 B2
(45) Date of Patent: May 2, 2023

(54) COATING INSTALLATION OF AN INDUSTRIAL MASS PRODUCTION COATING LINE INCLUDING NON-AQUEOUS SOLVENT COMPOSITION AS BARRIER LIQUID

(71) Applicant: AXALTA COATING SYSTEMS IP CO., LLC, Wilmington, DE (US)

(72) Inventors: Petra Stoffel, Cologne (DE); Marcus Brunner, Wuppertal (DE)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 29 days.

(21) Appl. No.: 16/559,314

(22) Filed: Sep. 3, 2019

(65) Prior Publication Data

US 2019/0388927 A1    Dec. 26, 2019

Related U.S. Application Data

(60) Continuation of application No. 14/717,473, filed on May 20, 2015, now abandoned, which is a division of application No. 14/360,929, filed as application No. PCT/US2012/065812 on Nov. 19, 2012, now abandoned.

(60) Provisional application No. 61/564,340, filed on Nov. 29, 2011.

(51) Int. Cl.
| | |
|---|---|
| C09D 7/63 | (2018.01) |
| B05B 15/55 | (2018.01) |
| C09D 9/00 | (2006.01) |
| B08B 3/08 | (2006.01) |
| C09D 7/20 | (2018.01) |
| C09D 7/00 | (2018.01) |

(52) U.S. Cl.
CPC .............. *C09D 7/63* (2018.01); *B05B 15/55* (2018.02); *B05B 15/557* (2018.02); *B08B 3/08* (2013.01); *C09D 7/20* (2018.01); *C09D 7/71* (2018.01); *C09D 9/005* (2013.01)

(58) Field of Classification Search
None
See application file for complete search history.

(56) References Cited

U.S. PATENT DOCUMENTS

| | | | |
|---|---|---|---|
| 4,993,353 A * | 2/1991 | Ogasawara | ............. B05B 12/14 |
| | | | 118/302 |
| 4,993,363 A | 2/1991 | Gvaryahu | |
| 5,264,485 A | 11/1993 | Miller et al. | |
| 2006/0189234 A1 * | 8/2006 | Kocher | ................ C09D 175/12 |
| | | | 442/59 |
| 2007/0254149 A1 * | 11/2007 | Eckert | ..................... C09D 5/29 |
| | | | 428/339 |
| 2009/0105073 A1 | 4/2009 | Taranta et al. | |

FOREIGN PATENT DOCUMENTS

| | | | | |
|---|---|---|---|---|
| EP | 1543883 A1 * | 6/2005 | ......... | B05B 12/1409 |
| EP | 1543883 A1 | 6/2005 | | |
| WO | 2011012559 A2 | 2/2011 | | |

OTHER PUBLICATIONS

ISA European Patent Office, International Search Report for International Application No. PCT/US2012/065812, dated Mar. 1, 2013.
ISA European Patent Office, International Preliminary Report on Patentability and Written Opinion for International Applicatoin No. PCT/US2012/065812, dated Jun. 12, 2014.
USPTO, non-final Office Action issued in U.S. Appl. No. 14/360,929, dated Aug. 14, 2014.
Response to non-final Office Action for U.S. Appl. No. 14/360,929, dated Nov. 14, 2014.
USPTO, Final Office Action issued in U.S. Appl. No. 14/360,929, dated Dec. 12, 2014.
Response to Final Office Action for U.S. Appl. No. 14/360,929, dated Feb. 12, 2015.
USPTO, Notice of Allowance issued in U.S. Appl. No. 14/360,929, dated Feb. 20, 2015.
EPO, European Examination Report issued in Application No. 12795255.4, dated Aug. 4, 2016.

* cited by examiner

*Primary Examiner* — Michael P. Rodriguez

(74) *Attorney, Agent, or Firm* — Lorenz & Kopf, LLP

(57) ABSTRACT

Coating installations are provided that include storage tanks for an aqueous base component and a non-aqueous hardener component, circulation lines for the components from the respective storage tanks, a mixer and an entrance to the mixer with a connection between each circulating line and the entrance to the mixer, and a release valve for the non-aqueous hardener component. The coating installation downstream of the non-aqueous hardener release valve is filled with a non-aqueous solvent composition comprising 0 to 10 wt. % of N-alkyl pyrrolidone, 0 to 5 wt. % of dimethyl sulfoxide, 10 to 50 wt. % of γ-butyrolactone, 10 to 50 wt. % of at least one monoalcohol, 10 to 60 wt. % of at least one organic solvent inert towards isocyanate groups, other than γ-butyrolactone, other than N-alkyl pyrrolidone, and consisting of carbon, hydrogen, oxygen and, optionally, nitrogen, and 0 to 10 wt. % of at least one additive.

2 Claims, No Drawings

COATING INSTALLATION OF AN INDUSTRIAL MASS PRODUCTION COATING LINE INCLUDING NON-AQUEOUS SOLVENT COMPOSITION AS BARRIER LIQUID

CROSS-REFERENCE TO RELATED APPLICATION

This application is a continuation of U.S. patent application Ser. No. 14/717,473, filed May 20, 2015, which is a divisional of U.S. patent application Ser. No. 14/360,929, filed May 27, 2014, which is a U.S. National-Stage entry under 35 U.S.C. § 371 based on International Application No. PCT/US2012/065812, filed Nov. 19, 2012 which was published under PCT Article 21(2) and which claims priority to U.S. Provisional Application No. 61/564,340, filed Nov. 29, 2011, which are all hereby incorporated in their entirety by reference.

FIELD OF THE INVENTION

The invention relates to a non-aqueous solvent composition and its use as barrier liquid (separation liquid) within a coating installation of an industrial mass production coating line for the application of water-borne two-component polyurethane coatings.

BACKGROUND OF THE INVENTION

EP 1 543 883 A1 discloses an arrangement of valves which can be used within a coating installation for the spray application of water-borne two-component polyurethane coatings. The coating installation can be used for the spray application of water-borne two-component polyurethane coatings on an industrial scale, i.e. it may be used as a coating installation in an industrial mass production coating line for the spray application of water-borne two-component polyurethane coatings.

Water-borne two-component polyurethane coating compositions comprise two components which are kept separately from each other during storage: (i) an aqueous base component comprising hydroxyl-functional binder resin (for brevity herein also called "aqueous base component") and (ii) a non-aqueous hardener component comprising polyisocyanate crosslinker (for brevity herein also called "non-aqueous hardener component"). To prepare the water-borne two-component polyurethane coating composition, the two components are mixed with each other shortly before application of the coating composition. In an industrial mass production coating line for the application of water-borne two-component polyurethane coatings the two components to be mixed are each conveyed or supplied in independent circulating lines (conduit pipes). Each circulating line is connected with the mixer, in particular a conventional static mixer such as a Kenics mixer. The connection between each circulating line and the mixer is made by a stub (feedtube, feedpipe) for each component. The connection includes parts like pumps and valves, wherein, typically, the valve closest to the mixer is the release valve (dispensing valve, dosage valve) for the respective component. The release valves are typically multi-port valves. The mixing with the static mixer allows a continuous mixing of the aqueous base component and the non-aqueous hardener component shortly before the spray application of the so prepared water-borne two-component polyurethane coating composition. The water-borne two-component polyurethane coating composition leaving the exit of the static mixer is fed to the spray-application devices.

The phrase "coating installation of an industrial mass production coating line for the spray-application of water-borne two-component polyurethane coatings" is used herein. It refers to the entire coating installation comprising, among others, storage tanks and circulation lines for the two components, pumps for feeding the two components, a mixer for mixing the two components, valves including release valves for the two components, one or more spray-application devices and any connecting pipework. In case of an industrial mass production coating line for the spray-application of water-borne two-component polyurethane coatings, where not only one, but a number of different, for example, differently colored water-borne two-component polyurethane coatings are spray-applied, basically the same applies. In such case there is not only one aqueous base component, but a number of different aqueous base components each of which having an own storage tank, circulation line etc. . . . . Similar applies in case there are more than one non-aqueous hardener components, although typically there is only one non-aqueous hardener component.

Industrial mass production coating processes are interrupted from time to time. Such interruptions may happen unintentionally or deliberately and they may take a shorter or longer period of time; examples of longer interruptions include production stops due to technical malfunction, shortage of coating material or of substrates to be coated, retrofitting, holiday, weekend and nonworking shifts. With regard to an industrial mass production coating process for the application of water-borne two-component polyurethane coatings, such downtimes or production stops require the installation downstream of the afore-mentioned release valves (for brevity also called "downstream installation") to be rinsed in order to remove coating material and to prevent the formation of lumps or incrustations in the downstream installation. Said downstream installation includes the static mixer, the spray-application devices, any possibly present valves and any connecting pipe work. The rinsing is automatically performed in mass-production coating lines for the application of water-borne two-component polyurethane coatings. An aqueous cleansing composition is typically used as rinsing medium, which is generally used in combination with pulse air to remove coating material from the downstream installation. As disclosed in EP 1 543 883 A1, a barrier liquid in the form of a non-aqueous solvent composition is then filled into the rinsed downstream installation so as to block access of the non-aqueous hardener component to the downstream installation and to prevent contact between non-aqueous hardener component and traces of water. Without such barrier liquid there is the risk of an unwanted formation of difficult-to-remove urea lumps within the downstream installation.

The barrier liquid may be filled into the downstream installation so as to entirely fill the downstream installation or to fill at least some space directly downstream of the non-aqueous hardener component release valve, for example, the connection between said valve and the entrance of the mixer.

A non-aqueous barrier liquid in the form of a mixture of an N-alkyl pyrrolidone with an alcohol and an ester has been commercialized as "Thinner/ECO Sperrmedium" by the applicant's German subsidiary DuPont Performance Coatings GmbH.

SUMMARY OF THE INVENTION

The invention is directed to a non-aqueous solvent composition comprising 0 to 10 wt. % (weight-%), preferably 0 wt. % of N-alkyl pyrrolidone, 0 to 5 wt. %, preferably 0 wt. % of dimethyl sulfoxide, 10 to 50 wt. %, preferably 25 to 35 wt. % of γ-butyrolactone (gamma-butyrolactone), 10 to 50 wt. %, preferably 25 to 35 wt. % of at least one monoalcohol, 10 to 60 wt. %, preferably 30 to 50 wt. % of at least one organic solvent inert towards isocyanate groups, other than γ-butyrolactone, other than N-alkyl pyrrolidone, and consisting of carbon, hydrogen, oxygen and, optionally, nitrogen, and 0 to 10 wt. %, preferably 0 wt. % of at least one additive.

DETAILED DESCRIPTION OF THE EMBODIMENTS

The applicant has found an improved barrier liquid in the form of the non-aqueous solvent composition disclosed in the preceding paragraph. The barrier liquid comprises γ-butyrolactone and, if any, at best a small amount of N-alkyl pyrrolidone. The above mentioned risk of an urea lump formation during downtimes of an industrial mass production coating line for the application of water-borne two-component polyurethane coatings can be reduced by using the improved barrier liquid. While not wishing to be bound by any theory, it is surmised that polyisocyanate getting accidentally into contact with traces of water (humidity originating from the pulse air, water originating from the aqueous base component and/or water originating from the aqueous cleansing composition) within the installation downstream of the non-aqueous hardener component release valve could react under formation of urea lumps or incrustations in said downstream installation. Apparently, but unexpectedly, the reactivity of the polyisocyanate towards water is less in the presence of γ-butyrolactone compared to its reactivity in the presence of N-alkyl pyrrolidone.

The term "organic solvent" is used herein. It means organic solvents in general and, in particular, such organic solvents as are conventionally used in paint and coatings. Such organic solvents include low-molecular compounds as well as oligomeric compounds but not polymers. The molar mass (in case of low-molecular compounds) or, respectively, the number-average molar mass (in case of an oligomer) of such organic solvents is preferably below 500.

The number-average molar mass data stated herein are number-average molar masses determined or to be determined by gel permeation chromatography (GPC; divinyl-benzene-cross-linked polystyrene as the immobile phase, tetrahydrofuran as the liquid phase, polystyrene standards).

The non-aqueous solvent composition comprises 0 to 10 wt. %, preferably 0 wt. % of N-alkyl pyrrolidone. Examples of N-alkylpyrrolidones include N-methylpyrrolidone and N-ethylpyrrolidone.

The non-aqueous solvent composition comprises 0 to 5 wt. %, preferably 0 wt. % of dimethyl sulfoxide.

The non-aqueous solvent composition comprises 10 to 50 wt. %, preferably 25 to 35 wt. % of γ-butyrolactone.

The non-aqueous solvent composition comprises 10 to 50 wt. %, preferably 25 to 35 wt. % of at least one monoalcohol, especially C3-C8 monoalcohol, more especially saturated C3-C8 monoalcohol. Examples of saturated C3-C8 monoalcohols can include the isomers of propanol, the isomers of butanol, the isomers of pentanol, the isomers of hexanol, the isomers of heptanol, the isomers of octanol, cycloaliphatic monoalcohols such as cyclohexanol, alkyl-substituted derivatives of cyclohexanol with no more than 8 carbon atoms, and the like. Preferred saturated C3-C8 monoalcohols can include the isomers of propanol, the isomers of butanol and the isomers of pentanol.

The non-aqueous solvent composition comprises 10 to 60 wt. %, preferably 30 to 50 wt. % of at least one organic solvent inert towards isocyanate groups, other than γ-butyrolactone, other than N-alkyl pyrrolidone, and consisting of carbon, hydrogen, oxygen and nitrogen, or consisting of carbon, hydrogen and oxygen. The organic solvents inert towards isocyanate groups, other than γ-butyrolactone and consisting of carbon, hydrogen and oxygen are preferred.

Examples of such organic solvents consisting of carbon, hydrogen, oxygen and nitrogen can include acyclic amides like 3-methoxy-N,N-dimethylpropionamide and 3-butoxy-N,N-dimethylpropionamide. 3-methoxy-N,N-dimethylpropionamide and 3-butoxy-N,N-dimethylpropionamide are available as Equamide M 100 and Equamide B 100, both from Idemitsu Kosan Co. Ltd., Tokyo.

Examples of such organic solvents consisting of carbon, hydrogen and oxygen can include ethers, for example, ethylene glycol di-C1-C6-alkyl ethers, propylene glycol di-C1-C6-alkyl ethers, diethylene glycol di-C1-C6-alkyl ethers, dipropylene glycol di-C1-C6-alkyl ethers and tetrahydrofuran; ketones, for example, acetone, methyl ethyl ketone, methyl propyl ketone, methyl isobutyl ketone, methyl amyl ketone, methyl isoamyl ketone, diethyl ketone, diisobutyl ketone, cyclohexanone, isophorone, 2,4-pentanedione and methoxy hexanone; esters, for example, ethyl ethoxypropionate, methyl glycol acetate, ethyl glycol acetate, butyl glycol acetate, butyl diglycol acetate, methoxypropyl acetate, ethoxypropyl acetate, methoxybutyl acetate, methyl acetate, ethyl acetate, propyl acetate, butyl acetate, isobutyl acetate, the pentyl acetate isomers, hexyl actetate, heptyl acetate, ethylhexyl acetate, methyl propionate, ethyl propionate, propyl propionate, butyl propionate, pentyl propionate, butyl butyrate, diethyl malonate, dimethyl adipate, dimethyl glutarate, dimethyl succinate, ethylene glycol diacetate and propylene glycol diacetate; lactones other than γ-butyrolactone, for example, ε-caprolactone; and carbonates, for example, dimethyl carbonate, dibutyl carbonate and propylene carbonate.

The non-aqueous solvent composition comprises 0 to 10 wt. %, preferably 0 wt. % of at least one additive. Examples of additives may include defoamers, wetting agents and surfactants.

In some embodiments, the non-aqueous solvent composition consists of 0 to 10 wt. %, preferably 0 wt. % of N-alkyl pyrrolidone, 0 to 5 wt. %, preferably 0 wt. % of dimethyl sulfoxide, 10 to 50 wt. %, preferably 25 to 35 wt. % of γ-butyrolactone, 10 to 50 wt. %, preferably 25 to 35 wt. % of at least one monoalcohol, especially C3-C8 monoalcohol, more especially saturated C3-C8 monoalcohol, 10 to 60 wt. %, preferably 30 to 50 wt. % of at least one organic solvent inert towards isocyanate groups, other than γ-butyrolactone, other than N-alkyl pyrrolidone, and consisting of carbon, hydrogen, oxygen and, optionally, nitrogen, and 0 to 10 wt. %, preferably 0 wt. % of at least one additive, wherein the sum of the wt. % totals 100 wt. %.

Preferred non-aqueous solvent compositions according to the invention consist of 25 to 35 wt. % of γ-butyrolactone, 25 to 35 wt. % of at least one monoalcohol, especially C3-C8 monoalcohol, more especially saturated C3-C8 monoalcohol, and 30 to 50 wt. % of at least one organic solvent inert towards isocyanate groups, other than γ-butyrolactone, and consisting of carbon, hydrogen and oxygen, wherein the sum of the wt. % totals 100 wt. %.

The non-aqueous solvent composition of the invention can be used as barrier liquid within a coating installation of an industrial mass production coating line for the application of water-borne two-component polyurethane coatings. The invention relates therefore also to the use of the non-aqueous solvent composition as barrier liquid within a coating installation of an industrial mass production coating line for the application of water-borne two-component polyurethane coatings. With regard to the coating installation of an industrial mass production coating line for the application of water-borne two-component polyurethane coatings, reference is made to the above section "Background of the Invention". As already disclosed there, it is typical that such a coating installation comprises, among others, a release valve for a non-aqueous hardener component, typically a non-aqueous polyisocyanate hardener. The non-aqueous solvent composition of the invention can in particular be used as barrier liquid within the installation downstream of such non-aqueous hardener component release valve of such coating installation of an industrial mass production coating line for the spray-application of water-borne two-component polyurethane coatings. The non-aqueous solvent composition may be filled into the downstream installation so as to entirely fill the downstream installation or to fill at least some space directly downstream of the non-aqueous hardener component release valve, for example, the connection between said valve and the entrance of the mixer.

EXAMPLES

Reference Example 1 (Production of a Polyisocyanate Composition 1)

30 pbw (parts by weight) of N-ethylpyrrolidone, 46 pbw of a hydrophilic aliphatic polyisocyanate based on hexamethylene diisocyanate with an NCO value of 17.4 and 24 pbw of DESMODUR® N 3600 from Bayer (trimerized hexamethylene diisocyanate with an NCO value of 23) were mixed.

Reference Example 2 (Production of a Polyisocyanate Composition 2)

29.5 pbw of γ-butyrolactone, 46 pbw of a hydrophilic aliphatic polyisocyanate based on hexamethylene diisocyanate with an NCO value of 17.4 and 24.5 pbw of DESMODUR® N 3600 from Bayer were mixed.

Example 3 (Production of a Solvent Composition)

29.5 pbw of γ-butyrolactone, 32.1 pbw of n-butanol and 38.4 pbw of butyl glycol acetate were mixed.

Reference Example 4 (Production of a Solvent Composition)

29.5 pbw of N-ethylpyrrolidone, 32.1 pbw of n-butanol and 38.4 pbw of butyl glycol acetate were mixed.

Reference Example 5

2 pbw of the polyisocyanate composition of reference example 1 were mixed with 1 pbw of the solvent composition of example 3 to form a first solvated polyisocyanate composition. In a separate operation, 2 pbw of the polyisocyanate composition of reference example 2 were mixed with 1 pbw of the solvent composition of example 3 to form a second solvated polyisocyanate composition. In a further separate operation, 2 pbw of the polyisocyanate composition of reference example 1 were mixed with 1 pbw of the solvent composition of reference example 4 to form a third solvated polyisocyanate composition.

98 pbw of each of the solvated polyisocyanate compositions were manually mixed with 2 pbw of deionized water making use of a spatula. In a separate operation, 99 pbw of each of the solvated polyisocyanate compositions were manually mixed with 1 pbw of deionized water making use of a spatula. The viscosity change of each mixture over time at 20° C. was qualitatively determined. The results are summarized in the following table 1.

TABLE 1

| | Mixtures of example compositions 1 + 3, 2 + 3 and 1 + 4 with water: | | | | | |
|---|---|---|---|---|---|---|
| | 1 + 4 with 1 wt. % of water | 1 + 3 with 1 wt. % of water | 2 + 3 with 1 wt. % of water | 1 + 4 with 2 wt. % of water | 1 + 3 with 2 wt. % of water | 2 + 3 with 2 wt. % of water |
| Initially | liquid, low viscosity | liquid, low viscosity | liquid, low viscosity | liquid, low viscosity | liquid, low viscosity | liquid, low viscosity |
| after 24 hours | liquid, low viscosity | liquid, low viscosity | liquid, low viscosity | increased viscosity | liquid, low viscosity | liquid, low viscosity |
| after 72 hours | solidified | increased viscosity | liquid, low viscosity | solidified | solidified | solidified |
| after 96 hours | | solidified | increased viscosity | | | |
| after 120 hours | | | solidified | | | |

What is claimed is:

1. A coating installation of an industrial mass production coating line for the application of a water-borne two-component polyurethane coating comprising:
   storage tanks for an aqueous base component and a non-aqueous hardener component;
   circulation lines for the components from the respective storage tanks,
   a mixer for receiving the aqueous base component and the non-aqueous hardener component to form a water-borne two-component polyurethane coating composition and an entrance to the mixer with a connection between each circulating line and the entrance to the mixer;
   a release valve for the non-aqueous hardener component in the connection between the circulating line for the non-aqueous hardener component and the entrance to the mixer;
   a spray-application device for spraying the water-borne two-component polyurethane coating composition to form the water-borne two-component polyurethane coating and connecting pipework downstream of the release valve for the non-aqueous hardener;
   wherein the coating installation downstream of the non-aqueous hardener release valve including the mixer, the spray-application devices, and connecting pipework is filled with a non-aqueous solvent composition comprising:
0 to 10 wt. % of N-alkyl pyrrolidone,
0 to 5 wt. % of dimethyl sulfoxide,
10 to 50 wt. % of γ-butyrolactone,
10 to 50 wt. % of at least one monoalcohol,
10 to 60 wt. % of at least one organic solvent inert towards isocyanate groups, other than γ-butyrolactone, other than N-alkyl pyrrolidone, and consisting of carbon, hydrogen, and oxygen and, optionally, nitrogen, and
0 to 10 wt. % of at least one additive.

2. The coating installation of claim 1, wherein the non-aqueous solvent composition consists of:
0 to 5 wt. % of dimethyl sulfoxide,
10 to 50 wt. % of γ-butyrolactone,
10 to 50 wt. % of at least one monoalcohol,
10 to 60 wt. % of at least one organic solvent inert towards isocyanate groups, other than γ-butyrolactone, other than N-alkyl pyrrolidone, and consisting of carbon, hydrogen, and oxygen, and
0 to 10 wt. % of at least one additive selected from the group consisting of defoamers, wetting agents, and surfactants;
wherein the sum of the wt. % totals 100 wt. %.

* * * * *